United States Patent [19]

Dykema

[11] Patent Number: 5,291,841
[45] Date of Patent: Mar. 8, 1994

[54] COAL COMBUSTION PROCESS FOR $SO_x$ AND $NO_x$ CONTROL

[76] Inventor: Owen W. Dykema, 23429 Welby Way, West Hills, Calif. 91307

[21] Appl. No.: 27,467

[22] Filed: Mar. 8, 1993

[51] Int. Cl.⁵ .................................................. F23D 1/00
[52] U.S. Cl. ....................................... 110/347; 110/345
[58] Field of Search ................ 110/347, 345, 344, 348

[56] References Cited

U.S. PATENT DOCUMENTS

| | | |
|---|---|---|
| 4,343,606 | 8/1982 | Blair et al. |
| 4,381,718 | 5/1983 | Carver et al. |
| 4,395,975 | 8/1983 | Ashworth et al. |
| 4,422,391 | 12/1983 | Izuha et al. ............................ 110/347 |
| 4,423,702 | 1/1984 | Ashworth et al. |
| 4,427,362 | 1/1984 | Dykema . |
| 4,475,472 | 10/1984 | Adrian et al. |
| 4,517,165 | 5/1985 | Moriarty . |
| 4,517,904 | 5/1985 | Penterson et al. .............. 110/347 X |
| 4,523,532 | 6/1985 | Moriarty et al. |
| 4,542,704 | 9/1985 | Brown et al. |
| 4,582,005 | 4/1986 | Brown . |
| 4,779,545 | 10/1988 | Breen et al. |
| 4,807,542 | 2/1989 | Dykema . |
| 4,951,579 | 8/1990 | Bell . |
| 5,085,156 | 2/1992 | Dykema . |

Primary Examiner—Edward G. Favors
Attorney, Agent, or Firm—Max Geldin

[57] ABSTRACT

A method of multi-stage combustion of sulfur and nitrogen-bearing coal which provides high combustion efficiency while preventing formation of sulfur- and nitrogen-bearing air pollutants. In the first stage, a major fraction of the hydrocarbons is burned out of the fuel [stage (1a)] at high temperature and the sulfur bound in the coal is freed therefrom and is then captured by reaction with a solid basic compound such as limestone [stage (1b)] at relatively low temperature. In stage 2 the remaining hydrocarbons in the fuel are burned out, and the residual mixture of coal ash and calcium-sulfur compounds is melted, encapsulating the sulfur in the molten slag, and a major portion of the molten compounds is removed from the gas stream. In stage 3, oxidation of CO and $H_2$ is almost entirely completed and combustion gases are substantially cooled by heat transfer to the working medium. In stage 4, combustion is finally completed in excess air. The entire combustion process is carried out under conditions to prevent formation of oxides of sulfur and nitrogen. In a preferred embodiment oxygen-rich air for combustion is introduced in stages 1a, 2 and 4, and nitrogen-rich air is introduced in stages 1b and 3.

22 Claims, 1 Drawing Sheet

COAL COMBUSTION PROCESS FOR $SO_x$ AND $NO_x$ CONTROL

BACKGROUND OF THE INVENTION

The present invention relates to a method of multistage combustion of sulfur- and nitrogen-bearing coal which provides high combustion efficiency and at the same time prevents formation of the air pollutants $SO_x$ and $NO_x$ (oxides of sulfur and nitrogen.)

It is known that during conventional combustion of fossil fuels, the nitrogen and sulfur chemically bound in those fuels can be oxidized to $NO_x$ and $SO_x$, respectively. In addition, $NO_x$ can be formed by high temperature oxidation of nitrogen in the combustion air. If these acid gases, $NO_x$ and $SO_x$, are released to the atmosphere, they can be absorbed in atmospheric moisture and thereafter precipitate to earth as acid rain.

The prior art discloses various processes under which nitrogen-bearing fuels and fuels bearing both nitrogen and sulfur can be burned, generally under fuel-rich conditions, to limit emissions of $NO_x$ and $SO_x$. Examples of prior art patents are:

| | |
|---|---|
| Blair et al | 4,343,606 |
| Carver et al | 4,381,718 |
| Ashworth et al | 4,395,975 |
| Ashworth et al | 4,423,702 |
| Dykema | 4,427,362 |
| Adrain et al | 4,475,472 |
| Moriarty | 4,517,165 |
| Moriarty et al | 4,523,532 |
| Brown et al | 4,542,704 |
| Brown | 4,582.005 |
| Breen et al | 4,779,545 |
| Dykema | 4,807,542 |
| Bell | 4,951,579 |
| Dykema | 5,085,156 |

None of the prior art teaches the need for an initial very high temperature combustion regime to free sulfur from its bound form in the coal. Neither does the prior art teach the need for both very high and low temperature regimes, together, to first free the sulfur from the coal and then to capture it with alkali materials, to optimize sulfur release and capture. In addition, none of the prior art teaches separation of all or part of the oxygen and nitrogen in the combustion air to provide both oxygen-rich and oxygen-lean combustion air, to sequentially raise and lower combustion temperatures, respectively, as required for optimum control of both $SO_x$ and $NO_x$.

It is an object of the present invention to efficiently and effectively control emissions of the oxides of both nitrogen ($NO_x$) and sulfur ($SO_x$) to atmosphere from processes involving combustion of coal with air.

Another object is the provision of a coal combustion process of the above type which not only controls the above pollutants but results in highly efficient fuel combustion and environmentally benign solid wastes as well.

A still further object is to provide a process as noted above which achieves clean coal combustion, wherein coal is burned to release heat for useful work and particularly to generate steam and electricity.

SUMMARY OF THE INVENTION

According to the invention, simultaneous variation and control of the air/fuel stoichiometric ratio (SR) and combustion temperature in a series of sequential stages allows carbon burnout to proceed almost to completion under fuel-rich conditions under which: (1) harmless molecular nitrogen is at all times the thermodynamically preferred form of nitrogen; and (2) sulfur can be converted, during combustion, directly from its original bound form in the fuel to a solid calcium-sulfur compound encapsulated in molten slag. A major fraction of the encapsulated sulfur can then be removed from the combustion gas stream with the slag. Combustion of the final, slightly fuel-rich products from this sequential process can then easily be completed in a final, excess air stage without appreciable oxidation of nitrogen in this air.

The process proceeds in a sequential series of four stages as follows:

Stage 1. Initial Hydrocarbon Burnout and Sulfur Control. A major fraction of the hydrocarbons is burned out of the fuel and sulfur and nitrogen are freed from their fuel-bound forms [stage (1a)]. Sulfur is captured by a solid, basic compound such as calcium oxide or limestone [stage (1b)].

Stage 2. Final Carbon Burnout and Slag Removal. The remaining hydrocarbons in the fuel are burned out, and the residual mixture of coal ash and calcium-sulfur compounds is melted, encapsulating the sulfur in the molten slag. A major fraction of the slag is removed from the gas stream and from the burner through a slag tap.

Stage 3. Preliminary CO and $H_2$ Burnout. Oxidation of CO and $H_2$ to carbon dioxide and water is almost entirely completed. Combustion gases are substantially cooled, by heat transfer to the working medium.

Stage 4. Final CO and $H_2$ Burnout. Combustion is finally completed, in excess air.

Combustion in all of these stages is carried out under progessively less fuel-rich conditions, ending in stage 4 in excess air. An important feature of the present invention, however, is the simultaneous, relatively wide variation and control of the combustion temperature, which not only creates operating conditions necessary for effective sulfur capture and disposal, in stages (1) and (2), but at all times maintains combustion conditions in the fuel-rich regimes under which molecular nitrogen is the thermodynamically preferred form of nitrogen. The latter conditions prevent even the momentary formation of nitrogen-based air pollutants.

To speed hydrocarbon combustion, to free sulfur from its bound form in coal, to melt the sulfur-bearing ash, and to maximize power cycle efficiencies, it is almost always desirable to operate at maximum (adiabatic equilibrium) combustion temperatures, consistent with SR conditions favoring molecular nitrogen. Exceptions to this are stages (1b) and (3). Temperatures below adiabatic are required in stage (1b) to facilitate capture of the freed sulfur, in the desired reduced calcium-sulfur compound form. In stage (3), where adiabatic equilibrium combustion temperatures are maximum, temperatures well below equilibrium are necessary simply to maintain conditions favoring the molecular form of nitrogen. Thus, relative to adiabatic equilibrium temperatures, the desired temperatures through the fuel-rich regimes of the combustion process are alternately high [stages (1a) and (2)] and low [stages (1b) and (3)]. Desired temperatures in the excess air combustion in stage 4 are also low relative to adiabatic but this is only after appreciable heat transfer to the working medium.

Primary fields of application of the invention process include all processes utilizing the heat from coal combustion. Particularly appropriate are coal-fired electric utility boilers, both retrofit and new, and coal-fired gas turbines in combined cycle power systems.

DESCRIPTION OF THE DRAWINGS

FIG. 2 shows the operating conditions, combustion gas stoichiometric ratios and temperatures, of the several stages and zones of combustion in the process relative to the temperatures of adiabatic equilibrium combustion of this same coal with air, and relative to those regimes in which the desired benign forms of sulfur and nitrogen are thermodynamically preferred.

DETAILED DESCRIPTION OF THE INVENTION AND PREFERRED EMBODIMENTS

Conversion of sulfur from its predominantly carbon-sulfur and iron-sulfur (organic and pyritic) forms in coal to more stable sorbent-sulfur compounds generally requires two distinct steps, one in which the sulfur is freed from its fuel-bound forms (gasified) and a second in which that freed sulfur is recaptured as the desired sorbent-sulfur compounds. Combustion conditions that promote these reactions tend to be opposite. Freeing and gasifying the sulfur is favored by high temperatures and relatively complete carbon burnout while re-capture by the sorbent is favored by lower temperatures. Sorbent sulfur capture, then, is best promoted by separating the process into two sequential combustion zones in a first stage, involving higher and lower temperatures, with the coal introduced into the first zone and the sorbent into the second.

Figure 1:
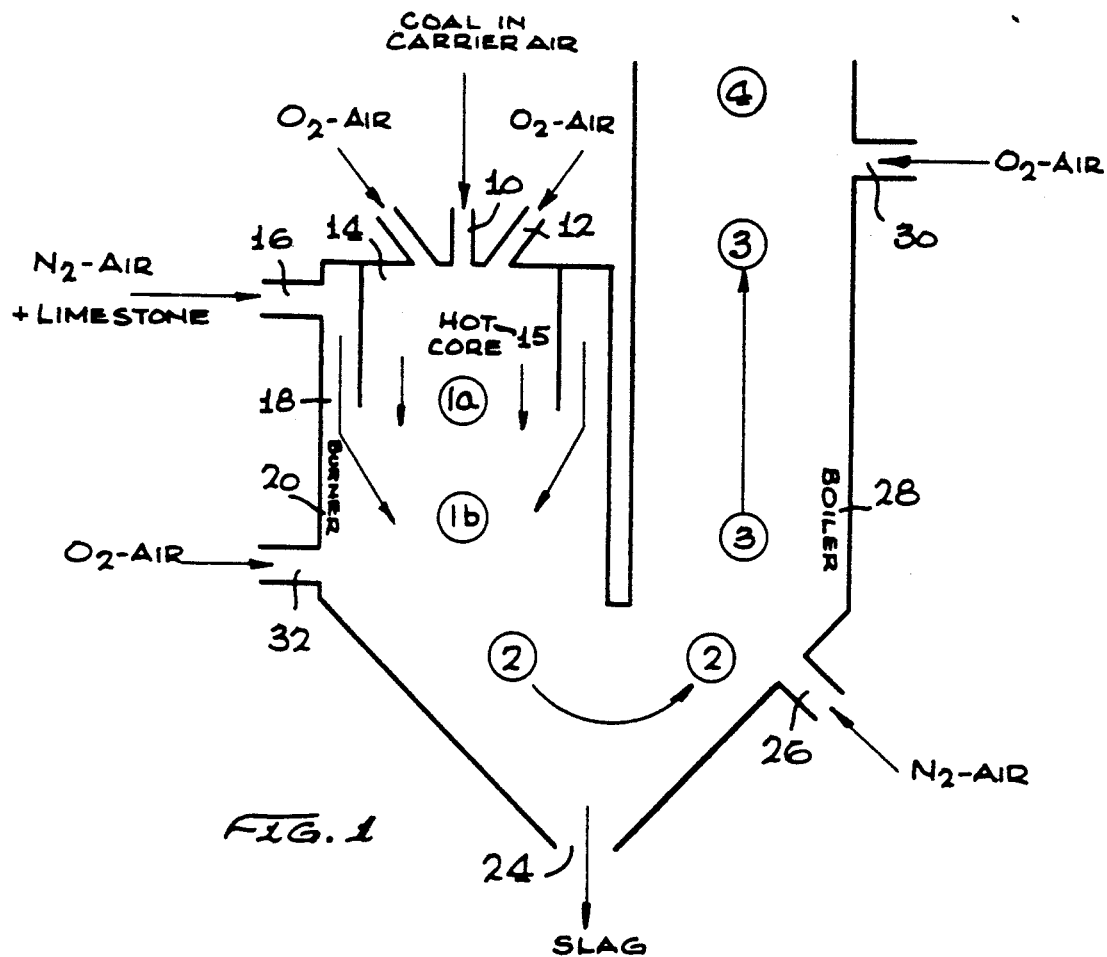
FIG. 1 illustrates a system for carrying out the invention.

The four-stage process of the invention for combustion of coal to maximize combustion efficiency while minimizing emissions of toxic air and solid waste pollutants is described in detail below in conjunction with FIG. 1, which illustrates schematically a system for carrying out the process.

Thus, in stage 1a pulverized coal entrained in a carrier air and a first oxygen-rich air are introduced at 10 and 12, respectively in a first combustion zone 1a in a first stage of combustion 14 to form a fluent mixture therein of the coal entrained in the first oxygen-rich air. From 25-40 wt. % of the oxygen-rich combustion air is oxygen, and the oxygen is present in an amount to provide 20-40% of the stoichiometric amount required for complete combustion of the coal. Temperature of reaction in such first stage combustion zone ranges from 1800-2300K. In this reaction a major fraction of the hydrocarbons is burned out of the fuel and the sulfur and nitrogen bound in the coal are freed and/or gasified. In most high sulfur bituminous coals, a substantial portion of the sulfur is in the form of iron pyrite, $FeS_2$. To achieve high sulfur capture from the coal, the first combustion zone is designed to operate with a central "hot core" 15. Preferably, in carrying out the invention process, at least 70% of the solids in the coal and the sulfur sorbent will pass through a 200 mesh screen. To hasten combustion and the freeing of sulfur in the hot core zone, the coal can be ground to microfine size.

There is a wide variation in gas temperatures in the various combustion stages necessary to optimize the combustion process and to provide maximum $SO_x$ and $NO_x$ control. Temperatures high enough to free sulfur from the fuel, as high as 1900K and higher, are not compatible with good sulfur capture by calcium, except under very fuel-rich conditions. Such high temperatures together with the necessary very fuel-rich combustion conditions (in the gas-phase) are very difficult to achieve in typical atmospheric pressure combustion. Thus, it is necessary first to burn the coal under moderately fuel-rich conditions and at very high temperatures, to free the sulfur, and then to quickly go to those low temperature yet moderately fuel-rich conditions compatible with effective capture of that now-freed sulfur. A preferred form of lowering combustion temperatures in this fuel-rich stage is to employ nitrogen in the combustion gases as a highly effective inert diluent in the combustion air.

The products of combustion from the first stage combustion zone 1a pass into a second combustion zone 1b in the first stage, and pulverized solid inorganic alkaline sulfur sorbent such as limestone, and a first nitrogen-rich air are introduced, at 16, to form a fluent mixture in a confined zone 18 around the hot core 15. The sorbent is introduced with the cooler, nitrogen-rich air to prevent sorbent dead burning in the hot core, thereby reducing its chemical activity. This mixture then mixes with the hot combustion products from the hot core 15 in first stage combustion zone 1b. The sulfur sorbent employed can be for example, oxides, hydroxides and carbonates, of calcium, magnesium and sodium, such as limestone. The oxygen is present in the first nitrogen-rich air in an amount to provide, together with oxygen from the first combustion zone, about 35-55% of the stoichiometric amount of oxygen required for complete combustion of the coal. Under these conditions, with cooler nitrogen-rich combustion air mixed with the hot combustion gases downstream of the hot core, the combustion temperature in the first stage combustion zone 1b is substantially reduced to a range of 1200-1500K.

Low temperature combustion conditions favor reaction between sulfur and the sulfur sorbent. The reaction of the sulfur with the sulfur sorbent forms compounds such as calcium sulfide. As a feature of the invention, the cooler nitrogen-rich combustion air is introduced around the central hot core not only to delay mixing with and dilution of the gases coming from the central hot core, but to keep both the high temperature gases from combustion zone 1a and the partially molten, "sticky" flyash in the gases coming from the central hot core away from the high temperature, refractory combustor walls in zone 1b. First stage nitrogen-rich air injection is designed specifically to keep the hot, burning coal particles airborne, out in the center of the combustor.

The products of combustion from the first stage combustion zone 1b, including sulfur-containing solids, coal ash and slag are introduced, together with a second oxygen-rich air at 32 in a second stage of combustion 2, to form a fluent mixture therein. Oxygen is present in the second oxygen-rich air in an amount to provide, together with oxygen from the first combustion stage, about 65-85% of the stoichiometric amount of oxygen required for complete combustion of the coal, the temperature in such second stage being substantially increased to 1300–2100K.

The primary objectives in stage 2 are to: (1) complete fuel carbon burnout and to establish the initial low levels of CO and $H_2$, while maintaining the very low levels of $NO_x$; (2) melt the flyash and slag, to encapsulate and retain the captured sulfur; (3) remove a major fraction of the molten slag; and (4) cool the gases somewhat, in preparation for the next combustion stage. The fuel-air mixture reacts in the second stage to burn out the remaining hydrocarbons in the fuel and to melt the residual mixture of coal ash, sulfur-bearing solids and excess sorbent. The resulting molten slag encapsulates and protects the captured sulfur compounds in a glassy, relatively impervious mass, which greatly reduces access to the captured sulfur by oxygen. A major fraction of the molten solids, including captured sulfur, is removed from the combustion gas stream and from the burner 20 by the sharp turn in gas flow, via the slag tap at 24. In addition, after slag removal, the second stage gases are appreciably cooled, by more than 400K, by heat transfer to the working fluid, such as the boiler indicated at 28, in preparation for combustion in the next stage and to assure solid particulate flyash the rest of the way through the boiler.

A second nitrogen-rich air is introduced at 26 into the products of combustion from the second combustion stage 2 in a third stage of combustion 3 to form a fluent mixture therein, oxygen being present in the second nitrogen-rich air in an amount to provide, together with oxygen from the second combustion stage, about 80–100% of the stoichiometric amount of oxygen required for complete combustion of the coal, reacting the mixture in the third stage of combustion. The combustion temperature in the third stage of combustion is substantially reduced to 1200–1800K from the second stage of combustion.

The primary objectives in stage 3 are to: (1) further reduce CO and $H_2$, while maintaining the very low levels of $NO_x$; and (2) further cool the combustion gases, in preparation for final combustion in excess air in the next stage. If standard combustion air were added to the combustion gases from the second stage, the initial combustion temperature and $NO_x$ levels would be as high as about 1900K and 50 ppm, respectively. The approach used in this invention is dilution of the combustion air to the third stage, with excess nitrogen or with recirculated flue gases, thereby reducing the temperature into the 1200–1800K range and preventing formation of any new $NO_x$. In addition, the third stage gases are appreciably cooled, by more than 300K, by heat transfer to the working medium, such as the boiler indicated at 28, in preparation for combustion in the final stage of excess air combustion.

A third oxygen-rich air is introduced at 30 into the products of combustion from the third combustion stage 3 in a fourth stage of combustion 4 to form a fluent mixture therein, oxygen being present in the third oxygen-rich combustion air in an amount to provide, together with oxygen from the third combustion stage, more than 100% of the stoichiometric amount of oxygen required for complete combustion of the coal. If recirculated flue gases, rather than nitrogen, are used in stage 3, then standard air can be used in stage 4. The initial combustion temperature in the fourth stage of combustion ranges from 1200–1600K.

The primary objective in stage 4 is to assure complete burnout of all fuel species without generating new $NO_x$, despite the fact that this final combustion takes place under conditions under which equilibrium $NO_x$ levels are quite high. In the present invention, formation of such $NO_x$ is prevented by delaying introduction of the final, excess combustion air until the third stage temperatures have been reduced into the so-called "kinetics corridor". In this corridor, even under excess air conditions, the net rates of oxidation of CO and $H_2$ are relatively fast but oxidation of nitrogen to $NO_x$ is essentially "frozen". In addition, cooling by heat transfer continues until the maximum available heat has been extracted.

Thus, the clean coal combustion process and system of the invention consists of five major steps, incorporated in four stages of combustion. The first three steps (1a, 1b and part of 2), approximately up to slag removal, require minimal heat loss to achieve optimum operating conditions and so are conducted in refractory-lined, only lightly cooled sections. These hot sections together can be considered the "Burner", as shown schematically at 20 in FIG. 1. Beyond slag removal it is important to begin transferring heat rapidly to the working fluid, to reduce the operating temperatures in the combustion process. These later sections (part of 2 and all of 3 and 4), then, largely take place in the boiler, or in the device making use of the heat of combustion, as indicated at 28 in FIG. 1.

In addition to controlled heat transfer, however, the operating conditions for these five steps are achieved by controlling not only the quantity of combustion air injected at the beginning of each step or stage (the stoichiometry) but by controlling the composition of that air ($O_2/N_2$ ratio) as well.

In preferred practice 25–40 wt % of the first and second oxygen-rich combustion air is oxygen, 80–95 wt % of the first nitrogen-rich combustion air is nitrogen, 80–90 wt % of the second nitrogen-rich combustion air is nitrogen, and 50–100 wt % of the third oxygen-rich combustion air is oxygen.

The wide temperature excursions necessary in stages 1 and 2 are created by separating part of the nitrogen in the stages 1a and 2 combustion air and diverting that separated nitrogen to stage 1b, where it serves as a temperature-reducing inert diluent. As a result, the nitrogen concentration in the combustion air fed to stage 1a is low (or in relative terms the oxygen concentration is high), creating the relatively hot yet very fuel-rich conditions necessary for rapid initial hydrocarbon combustion and to free the fuel-bound sulfur. The separated nitrogen added to the combustion air fed to stage 1b then creates the relatively cool but still very fuel-rich conditions under which the stable, e.g. calcium-sulfur, compounds can be formed.

A similar nitrogen diversion process can be carried out between stages 3 and 4 as well. Some of the nitrogen can be removed from the stage 4 air and added to the stage 3 air. Some nitrogen separated from the stage 4 air could also be diverted to stage 1b, to further reduce the temperature in that critical sulfur control stage. On the other hand, stage 3 is only slightly fuel-rich, so recirculated flue gases can serve as a sufficiently inert diluent as well.

Various commercial means are available to entirely or partially separate oxygen and nitrogen in part of the combustion air to the various stages of the process. These separated components can then be mixed into the various stages of combustion air. The most common, state-of-the-art approach is to use cryogenic separation to generate relatively pure oxygen and nitrogen. Another may involve membrane separation, in which part of the nitrogen is removed from one combustion air stream and mixed into another. Also, recirculated flue gases represent a reasonably practical "inert" diluent for combustion gases, that are only slightly fuel-rich, such as those in stage 3.

In a particular embodiment, the combustion air introduced into the fourth stage of combustion is not quite so oxygen-rich, containing only 23–40 wt % oxygen, and that introduced into the third stage is standard air. Recirculated flue gases, instead of nitrogen, are mixed into the third stage combustion air, to control the initial combustion temperature in that stage.

The following is a specific example of practice of the invention:

EXAMPLE

The following illustrates combustion of a typical or generic high sulfur bituminous coal (Illinois #6), in which an appreciable fraction of the sulfur is in the pyritic form, fired in accordance with the present invention as described above at atmospheric pressure and with 500F combustion air preheat. The as-received coal composition is listed in Table 1.

TABLE 1

| | |
|---|---|
| Carbon | 67.1 |
| Hydrogen | 4.5 |
| Nitrogen | 1.5 |
| Sulfur | 2.6 |
| Oxygen | 6.8 |
| Ash | 10.5 |
| Moisture | 7.0 |
| | 100.0 |

Figure 2:
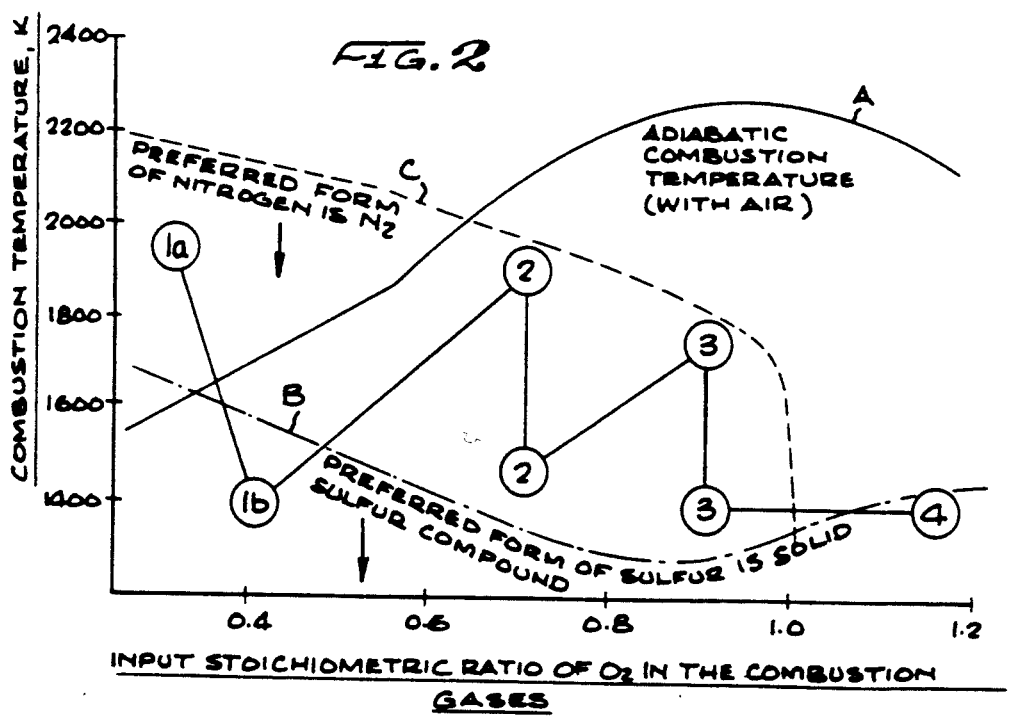
FIG. 2 illustrates parameters including combustion temperature and input oxygen stoichiometric ratios in air required for complete combustion, in various steps of the invention process for a specific example of operation utilizing a typical bituminous coal sample.

FIG. 2 of the drawing shows the combustion temperatures and input stoichiometric ratios of oxygen in the air required for complete combustion of the coal, in each of stages 1a, 1b, 2, 3 and 4. Such specific combustion temperatures and specific stoichiometric ratios are within the ranges noted above.

To provide a 2:1 mole ratio of calcium:sulfur in the coal, 294 lbs of pulverized limestone per ton of as-received coal is entrained in the stage 1b combustion air. The melted coal ash and slag and encapsulated calcium sulfide are removed from the combustion gas stream in stage 2.

Half of the nitrogen in the combustion air going to stages 1a, 2 and 4 is removed and mixed with the (standard) air going to stage 1b; and the remaining half of the nitrogen in the combustion air going to stage 4 is also removed and mixed with the (standard) air going to stage 3. Combustion "air" going to stage 4, then, is pure oxygen.

The resulting total flow rates and the weight percent of oxygen in the air going to the various combustion stages and zones, and the resulting stoichiometric ratios in each stage, are shown in Table 2.

TABLE 2

| Stage/Zone Flowrates and Composition | | | |
|---|---|---|---|
| Stage/Zone | Flow Rate[1] | Oxygen Conc[2] | SR |
| CA[3] | 0.800 | 23.2[5] | — |
| 1a | 1.103 | 37.6 | 0.30 |
| 1b[4] | 3.378 | 5.9 | 0.40 |
| 2 | 1.596 | 37.6 | 0.70 |
| 3 | 2.557 | 15.6 | 0.90 |
| 4 | 0.500 | 100.0 | 1.15 |

SR = stoichiometric ratio of $O_2$ required for complete combustion.
[1] Lbs/lb of as-fired coal
[2] Weight percent
[3] CA = PC carrier air
[4] Carries the pulverized limestone
[5] Standard air Besides dilution with excess nitrogen, temperatures are also reduced by direct heat transfer to the working fluid (usually water or steam), only slightly in stages 1 and 2 but significantly in most of stage 2 and all of stages 3 and 4. The resulting temperatures and some of the specific combustion product compositions are listed in Table 3.

TABLE 3

| | | Combustion Product Temperatures and Compositions | | | | | | | |
|---|---|---|---|---|---|---|---|---|---|
| | | Temp. K | | | Comp. MOL % | | | PPM[2] | |
| Stage/Zone | SR | In | Out | Heat Trans[1] | C(s) | CO | $H_2$ | $SO_2$ | $NO_x$ |
| CA | — | Amb. | — | 0.0 | 100.0 | 0.0 | 0.0 | 0 | 0 |
| 1a | 0.30 | 1973 | 1956 | 0.4 | 40.0 | 26.1 | 7.0 | 2600 | 0 |
| 1b | 0.40 | 1412 | 1391 | 0.9 | 24.1 | 12.2 | 4.1 | 0 | 0 |
| 2 | 0.70 | 1922 | 1473 | 20.6 | 0 | 7.5 | 1.8 | 0 | 0 |
| 3 | 0.90 | 1758 | 1408 | 19.7 | 0 | 0.5 | 0.1 | 0 | 0 |
| 4 | 1.15 | 1422 | Amb. | 58.4 | 0 | 0.0 | 0.0 | 0 | 0 |

[1] Percent of available heat
[2] In final excess air, at 3% $O_2$

It is noted, in FIG. 2 based on Table 3, that although little heat is transferred out of the first stage combustion gases, the temperature in the first combustion zone 1a is significantly higher and that of the second combustion zone 1b is significantly lower than that of adiabatic equilibrium combustion of the coal with standard air, as indicated by line A, and that temperatures at all subsequent zones and stages are substantially lower than such adiabatic equilibrium temperature. This is a direct result of the removal of diluent nitrogen out of the zone 1a combustion air and, together with additional nitrogen removed from stage 2 combustion air, addition of such nitrogen to the zone 1b combustion air.

It is also noted that combustion temperatures in the first combustion zone in the first stage of combustion, and in the beginning of the second stage, are substantially higher than in the second combustion zone in the first stage of combustion.

Table 3 shows the final results of the invention process. The prime function of the process is to completely convert the coal hydrocarbons into their most oxidized, lowest energy forms, $CO_2$ and $H_2O$, before leaving the useful work area (go out the stack), thereby releasing the maximum heat for other useful purposes. However, the process of this invention is designed not only to efficiently accomplish this prime task but at the same time to prevent formation of the toxic oxides of sulfur and nitrogen and to remove coal ash in an environmentally benign form.

Table 3 further shows that initially, in stage 1, not all the carbon is burned out of the fuel, much less all converted to $CO_2$ and water. This is because there is not sufficient oxygen to oxidize all of the carbon even to its lowest oxide, CO. The first stage is operated under these very fuel-rich conditions to assure that all of the sulfur and nitrogen are freed from their bound forms in the coal and are converted, respectively, to benign solid sulfur-calcium compounds and to molecular nitrogen.

Table 3 also shows sulfur first appearing, in stage 1a, as $SO_2$ (equivalent out the stack) and then quickly disappearing in stage 1b where the thermodynamically preferred form of sulfur is solid sulfur compound, i.e. CaS, in the present example, as shown relative to line B in FIG. 2. In the actual case, much of the sulfur may, in effect, proceed directly from the fuel-bound form to CaS.

FIG. 2 shows that operating conditions all the way through stages 1–3 are such that the thermodynamically preferred form of nitrogen is always the harmless molecular form, as shown relative to line C of FIG. 2. Nitrogen driven out of the coal quickly converts to $N_2$ and remains in that form throughout the rest of the combustion process. Table 3 shows zero $NO_x$ throughout these stages.

Table 3 shows that carbon burnout is completed in stage 2 and by the end of stage 3, CO and $H_2$ are reduced to very low levels. The sulfur captured in the solid form in stage 1b is protected from conversion to $H_2S$ and $SO_2$ in subsequent stages by melting the coal ash, thereby encapsulating the solid sulfur compounds in molten slag, and then by removing a major fraction of this sulfur-bearing molten slag from the burner, through a slag tap.

Finally, temperature is carefully controlled in the latter part of stage 3 such that when final, excess air is added to the gases to form stage 4, high up in a boiler, no appreciable new $NO_x$ will be formed by oxidation of nitrogen in the air. Table 3 particularly shows that there is no CO, $H_2$, $SO_2$ or $NO_x$ in the stage 4 combustion gases (exiting the stack).

From the foregoing, it is seen that the present invention provides a process for the efficient combustion of coal with minimum formation of sulfur-and nitrogen-bearing air pollutants from bound sulfur and nitrogen in the coal or from oxidation of nitrogen in the combustion air.

Since various changes and modifications of the invention will occur to those skilled in the art within the spirit of the invention, the invention is not to be taken as limited except by the scope of the appended claims.

What is claimed is:

1. A process for combustion of coal to maximize combustion efficiency while minimizing emissions of the air pollutants $SO_x$ and $NO_x$, which comprises
   introducing pulverized coal and a first oxygen-rich air into a first combustion zone (1a) in a first stage of combustion to form a mixture therein, and subjecting said mixture to combustion in said first combustion zone,
   introducing a pulverized solid basic compound capable of reaction with sulfur generated from the coal and a first nitrogen-rich air into the products of combustion from said first combustion zone in a second combustion zone (1b) in said first stage of combustion, to form a mixture therein, and reacting said mixture in said second combustion zone, and forming solid sulfur-bearing compounds,
   introducing a second oxygen-rich air into the products of combustion from said first combustion stage in a second stage of combustion (2) to form a mixture therein, and reacting said mixture in said second stage of combustion, to substantially burn out remaining hydrocarbons and to form molten slag, and encapsulating the sulfur-bearing compounds therein, and removing a major portion of said molten slag and said sulfur-bearing compounds from the combustion gas stream, and cooling the combustion gases,
   introducing a second nitrogen-rich air into the products of combustion from said second combustion stage in a third stage of combustion (3), and reacting said mixture in said third stage of combustion and cooling the combustion gases, and
   introducing a third oxygen-rich air into the products of combustion from said third combustion stage in a fourth stage of combustion (4) and completing combustion and cooling said mixture in said fourth stage of combustion.

2. The process of claim 1, wherein the combustion temperature in said first combustion zone (1a) of said first stage of combustion is substantially higher than that of adiabatic equilibrium combustion of said pulverized coal with standard air, and temperatures of all subsequent zones and stages are substantially lower than such adiabatic equilibrium temperature.

3. The process of claim 1, wherein a portion of the nitrogen is separated from the combustion air introduced in stages (1a) and (2), to form said first oxygen-rich air and said second oxygen-rich air, and said separated nitrogen is diverted to the air introduced into stage (1b) to form said first nitrogen-rich air, and wherein a portion of the nitrogen is separated from the combustion air introduced in stage (4), to form said third oxygen-rich air, and said separated nitrogen is diverted to the air introduced in one or both of stage (1b) and stage (3).

4. The process of claim 1, wherein 23–40 wt % of said third oxygen-rich combustion air is oxygen, said second nitrogen-rich combustion air is standard air, and recirculated flue gases are mixed into said standard air and introduced into said third stage of combustion to control the initial combustion temperature in said third stage of combustion.

5. The process of claim 1, wherein the nitrogen-rich air introduced into the second combustion zone (1b) is introduced into a confined zone around a central hot core in said first combustion zone (1a) and subsequently mixed with the combustion gases from zone (1a) in zone (1b) in a manner which keeps the hot burning coal particles in zone (1b) away from the wall of the combustion zone in zone (1b).

6. In the process for combustion of coal to minimize emissions of oxides of sulfur ($SO_x$) air pollutants, the improvement which comprises
   introducing pulverized coal and an oxygen-rich air into a first combustion zone to form a mixture therein, and subjecting said mixture to combustion at high temperature and freeing sulfur bound in the coal, and
   introducing a pulverized solid basic compound capable of reaction with said sulfur and a nitrogen-rich air into the products of combustion from said first combustion zone in a second combustion zone to form a mixture therein, and reacting said mixture in said second combustion zone at relatively low temperature and capturing said sulfur by reaction thereof with said basic compound to form sulfur compounds.

7. The process of claim 6, and including introducing a second oxygen-rich air into the products of combustion from said second combustion zone in another stage of combustion to form a mixture therein, and reacting said mixture in said another stage of combustion, to substantially burn out remaining hydrocarbons and to form molten slag, and encapsulating the sulfur-bearing compounds therein, and removing a major portion of said molten slag and said sulfur-bearing compounds from the combustion gas stream.

8. The process of claim 6, wherein the combustion temperature in said first combustion zone ranges from 1800–2300K and the combustion temperature in said second zone ranges from 1200–1500K.

9. The process of claim 6, wherein said basic compound is selected from the group consisting of oxides, hydroxides and carbonates of calcium, magnesium and sodium.

10. A four-stage process for combustion of coal to maximize combustion efficiency while minimizing emissions of toxic air and solid waste pollutants, consisting essentially of
   (a) introducing pulverized coal and a first oxygen-rich air into a first combustion zone in a first stage of combustion to form a fluent mixture therein of said coal entrained in said first oxygen-rich air, and reacting said mixture in said first combustion zone in said first stage of combustion and freeing sulfur and nitrogen chemically bound in the coal;
   (b) introducing a pulverized solid inorganic alkaline sulfur sorbent and a first nitrogen-rich air into the products of combustion from said first combustion zone in a second combustion zone in said first stage of combustion to form a fluent mixture therein, and reacting said mixture in said second combustion zone in said first stage of combustion and forming sulfur compounds by reaction of sulfur with said alkaline sulfur sorbent;
   (c) introducing a second oxygen-rich air into the products of combustion from said first combustion stage in a second stage of combustion to form a fluent mixture therein, and reacting said mixture in said second stage of combustion, melting coal ash and slag, and encapsulating said sulfur compounds in said molten slag, and removing a major fraction of the molten solids from the combustion gas stream;
   (d) introducing a second nitrogen-rich air into the products of combustion from said second combustion stage in a third stage of combustion to form a fluent mixture therein, and reacting said mixture in said third stage of combustion and cooling the combustion gases; and
   (e) introducing a third oxygen-rich air into the products of combustion from said third combustion stage in a fourth stage of combustion to form a fluent mixture therein, and completing combustion and cooling said mixture in said fourth stage of combustion to extract the maximum available heat.

11. The process of claim 10, wherein combustion temperatures in said first combustion zone in said first stage of combustion, and in the beginning of said second stage, are substantially higher than in said second combustion zone in said first stage of combustion.

12. A four-stage process for combustion of coal to maximize combustion efficiency while minimizing emissions of toxic air and solid waste pollutants, consisting essentially of
   (a) introducing pulverized coal and a first oxygen-rich air into a first combustion zone in a first stage of combustion to form a fluent mixture therein of said coal entrained in said first oxygen-rich air, the oxygen being present in an amount to provide 20–40% of the stoichiometric amount required for complete combustion of said coal, and reacting said mixture in said first combustion zone in said first stage of combustion and freeing sulfur and nitrogen bound in the coal,
   (b) introducing a pulverized solid inorganic alkaline sulfur sorbent and a first nitrogen-rich air into the products of combustion from said first combustion zone in a second combustion zone in said first stage of combustion to form a fluent mixture therein, oxygen being present in said first nitrogen-rich air in an amount to provide, together with oxygen from said first combustion zone, about 35–55% of the stoichiometric amount of oxygen required for complete combustion of said coal, and reacting said mixture in said second combustion zone in said first stage of combustion and forming sulfur compounds by reaction of sulfur with said alkaline sulfur sorbent,
   (c) introducing a second oxygen-rich air into the products of combustion from said first combustion stage in a second stage of combustion to form a fluent mixture therein, oxygen being present in said second oxygen-rich air in an amount to provide, together with oxygen from said first combustion stage, about 65–85% of the stoichiometric amount of oxygen required for complete combustion of said coal, and reacting said mixture in said second stage of combustion, melting coal ash and slag, encapsulating said sulfur compounds in said molten slag, removing a major fraction of the molten solids from the combustion gas stream, and cooling the second stage combustion gases by more than 400K;
   (d) introducing a second nitrogen-rich air into the products of combustion from said second combustion stage in a third stage of combustion to form a fluent mixture therein, oxygen being present in said second nitrogen-rich air in an amount to provide, together with oxygen from said second combustion stage, about 80–100% of the stoichiometric amount of oxygen required for complete combustion of said coal, and reacting said mixture in said third stage of combustion and cooling the combustion gases by more than 300K; and
   (e) introducing a third oxygen-rich air into the products of combustion from said third combustion stage in a fourth stage of combustion to form a fluent mixture therein, oxygen being present in said third oxygen-rich combustion air in an amount to provide, together with oxygen from said third combustion stage, more than 100% of the stoichiometric amount of oxygen required for complete combustion of said coal, and completing combustion and cooling of said mixture in said fourth stage of combustion to extract the maximum available heat.

13. The process of claim 12, wherein said first nitrogen-rich air surrounds the first combustion zone and is gradually mixed into the products of combustion from said first combustion zone to form said second combustion zone, and all other stages of combustion are sequential.

14. The process of claim 12, wherein 25–40 wt % of said first and second oxygen-rich combustion air is oxygen, 80–95 wt % of said first nitrogen-rich combustion air is nitrogen, 80–90 wt % of said second nitrogen-rich combustion air is nitrogen, and 50–100 wt % of said third oxygen-rich combustion air is oxygen.

15. The process of claim 12, wherein the combustion temperature in said first zone in said first stage of combustion if 1800–2300K.

16. The process of claim 12, wherein the combustion temperature in said second zone in said first stage of combustion is 1200–1500K.

17. The process of claim 12, wherein the combustion temperature in said second stage of combustion is 1300–2100K.

18. The process of claim 12, wherein the combustion temperature in said third stage of combustion is 1200–1800K.

19. The process of claim 12, wherein the initial combustion temperature in said fourth stage of combustion is 1200–1600K.

20. The process of claim 12, wherein at least 70% of the solids in said pulverized coal and said sulfur sorbent will pass through a 200 mesh screen.

21. The process of claim 12, wherein said sulfur sorbent is selected from the group consisting of the oxides, hydroxides and carbonates of calcium, magnesium and sodium.

22. The process of claim 12, wherein a portion of the nitrogen is separated from the combustion air introduced into said first combustion zone, and from the air introduced into said second stage, to form said first oxygen-rich air and said second oxygen-rich air, and said separated nitrogen is incorporated into the air introduced into said second combustion zone to form said first nitrogen-rich air, and wherein a portion of the nitrogen is separated from the combustion air introduced in said fourth stage, to form said third oxygen-rich air, and said separated nitrogen is incorporated into the air introduced into said second combustion zone and into said third stage, to form said first nitrogen-rich air and said second nitrogen-rich air.

* * * * *